United States Patent
You et al.

(10) Patent No.: US 12,074,947 B2
(45) Date of Patent: Aug. 27, 2024

(54) NETWORK CONNECTION METHOD AND NETWORK DEVICE USING NETWORK CONNECTION METHOD

(71) Applicant: SENSEBERG TECHNOLOGY CO., LTD., Guangdong (CN)

(72) Inventors: Jun You, Guangdong (CN); Jun Wang, Guangdong (CN)

(73) Assignee: SENSEBERG TECHNOLOGY CO., LTD., Guangdong (CN)

(*) Notice: Subject to any disclaimer, the term of this patent is extended or adjusted under 35 U.S.C. 154(b) by 337 days.

(21) Appl. No.: 17/729,784

(22) Filed: Apr. 26, 2022

(65) Prior Publication Data

US 2022/0256000 A1    Aug. 11, 2022

Related U.S. Application Data

(63) Continuation-in-part of application No. PCT/CN2020/082766, filed on Apr. 1, 2020.

(30) Foreign Application Priority Data

Dec. 9, 2019   (CN) .......................... 201911248759.0

(51) Int. Cl.
*H04B 10/00* (2013.01)
*H04B 10/11* (2013.01)
(Continued)

(52) U.S. Cl.
CPC ............ *H04L 67/141* (2013.01); *H04B 10/11* (2013.01)

(58) Field of Classification Search
CPC ............ H04B 10/1129; H04B 10/1149; H04B 10/116; H04L 67/1068
See application file for complete search history.

(56) References Cited

U.S. PATENT DOCUMENTS

| 11,108,733 B2 | 8/2021 | You et al. |
| 2013/0117439 A1 | 5/2013 | Oliver et al. |

(Continued)

FOREIGN PATENT DOCUMENTS

| CN | 101345998 A | 1/2009 |
| CN | 103986631 A | 8/2014 |

(Continued)

OTHER PUBLICATIONS

International Search report for PCT/CN2020/082766, prepared by the China National Intellectual Property Administration, mailing date Sep. 2, 2020, 5 pages, including English translation.

*Primary Examiner* — Daniel G Dobson
(74) *Attorney, Agent, or Firm* — Brooks Kushman P.C.

(57) ABSTRACT

A network connection method is provided. The network connection method includes: transmitting a detection instruction in a preset format to a second network device to instruct the second network device to query second network address information conforming to a standard of the detection instruction according to the protocol identification information; receiving the second network address information fed back by the second network device according to the first network address information, and connecting to the second network device according to the second network address information. According to the network connection method in the present application, network address information of other network devices can also be obtained by only sending an unidirectional detection instruction although other network devices are unknown to the first network device, so that these network devices can be conveniently connected through a network application.

20 Claims, 4 Drawing Sheets

(51) Int. Cl.
    *H04L 67/141*     (2022.01)
    *H04J 14/00*     (2006.01)

(56)     References Cited

U.S. PATENT DOCUMENTS

| 2014/0146731 | A1 | 5/2014 | Hynell et al. | |
|---|---|---|---|---|
| 2015/0201443 | A1* | 7/2015 | Emani | H04W 76/14 |
| | | | | 370/338 |
| 2017/0265053 | A1* | 9/2017 | Diebold | H04W 76/14 |
| 2018/0176637 | A1 | 6/2018 | Cho et al. | |
| 2018/0367987 | A1 | 12/2018 | Xie et al. | |

FOREIGN PATENT DOCUMENTS

| CN | 104142868 | A | 11/2014 |
|---|---|---|---|
| CN | 105450515 | A | 3/2016 |
| CN | 110035005 | A | 7/2019 |
| CN | 110418311 | A | 11/2019 |
| KR | 20160080831 | A | 7/2016 |

\* cited by examiner

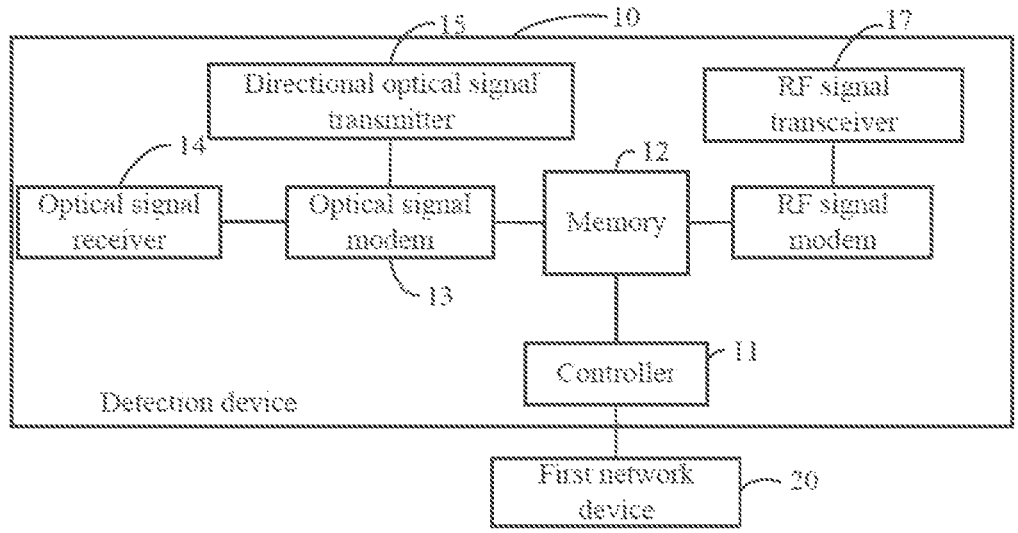

FIG. 1

Transmit a detection instruction in a preset format to a second network device to instruct the second network device to query second network address information conforming to a standard of the detection instruction from a memory of a detection device according to the protocol identification information, the detection instruction contains protocol identification information and first network address information of the first network device — S201

Receive the second network address information fed back by the second network device according to the first network address information, and connecting to the second network device according to the second network address information. — S202

FIG. 2

NETWORK CONNECTION METHOD AND NETWORK DEVICE USING NETWORK CONNECTION METHOD

CROSS-REFERENCE TO RELATED APPLICATIONS

This application is a continuation-in-part of PCT International patent application No. PCT/CN2020/082766, filed on Apr. 1, 2020, which claims priority to Chinese Patent Application No. 201911248759.0 filed on Dec. 9, 2019, and entitled "connection method for network device and network device", the entire contents of which are incorporated herein by reference.

FIELD

The present application relates to the technical field of communications, and particularly relates to a network connection method and a network device using the network connection method.

BACKGROUND

With the development of technologies of Internet and Internet of Things, applications may communicate between different network devices through various network protocols.

At present, before communicating between different terminal devices, it is necessary to obtain a network address of another device, the network protocol supported by this device, and the port corresponding to the network protocol first; then, the application program is connected to this device through the Internet. With the popularity of Internet of Things, a large number of network devices are used in people's lives, there is no effective approach for people to know the large number of network devices, so that these network devices cannot be conveniently connected through network applications.

SUMMARY

In view of this, an objective of the present application is providing a connection method for a network device and a network device to solve a problem that there is no effective approach for people to know the large number of network devices, so that these network devices cannot be conveniently connected through network applications.

In order to solve the technical problem discussed above, the technical solutions adopted in the embodiments of the present application are listed below:

In the first aspect, a network connection method is provided, this method includes:
 transmitting, by the first network device, a detection instruction in a preset format to a second network device to instruct the second network device to query second network address information conforming to a standard of the detection instruction from a memory of a detection device according to the protocol identification information, where the detection instruction contains protocol identification information and first network address information of the first network device; and
 receiving, by the first network device, the second network address information fed back by the second network device according to the first network address information, and connecting to the second network device according to the second network address information.

In the second aspect, another network connection method is provided, this method includes:
 receiving, by a second network device, a detection instruction in a preset format from the first network device, where the detection instruction includes protocol identification information and first network address information of the first network device;
 querying second network address information conforming to a standard of the detection instruction by the second network device according to the protocol identification information;
 transmitting, by the second network device, the second network address information to the first network device according to the first network address information to enable the first network device to connect to the second network device according to the second network address information.

In the third aspect, a first network device is provided, the first network device includes a detection device, a memory, a processor, and a computer program stored in the memory and executable by the processor, the processor is configured to, when executing the computer program, implement a network connection method, including: transmitting a detection instruction in a preset format to a second network device to instruct the second network device to query second network address information conforming to a standard of the detection instruction from a memory of a detection device according to the protocol identification information; where the detection instruction contains protocol identification information and first network address information of the first network device; and receiving the second network address information fed back by the second network device according to the first network address information, and connecting to the second network device according to the second network address information.

In the fourth aspect, a computer readable storage medium is provided, the computer readable storage medium stores a computer program, that, when executed by a processor, causes the processor to implement the network connection method.

In the fifth aspect, a computer program product is provided, when the computer program product is executed on a terminal device, the terminal device is caused to implement the network connection method in any one of the first aspect.

The network connection method according to the embodiments of the present application has the beneficial effects listed below:
 the detection instruction in the preset format is transmitted to the second network device, where the detection instruction includes protocol identification information and first network address information of the first network device, and the detection instruction is used to instruct the second network device to query the second network address information conforming to the standard of the detection instruction according to the protocol identification information; the second network address information which is fed back by the second network device according to the first network address information is received, and the second network device is connected according to the second network address information; although other network devices are unknown, the network address information of other network devices can still be obtained only by transmitting unidirectional detection instructions, not only the network address information of the local network device can be obtained, the network address information of the remote server supported by the network protocol can also be obtained, so that the network devices can be conveniently connected through network application, and interaction between the network devices is further realized.

It can be understood that, regarding the beneficial effects of the second aspect, the third aspect, the fourth aspect and the fifth aspect, reference can be made to the related descriptions in the first aspect, and the details of the beneficial effects of the second aspect, the third aspect, the fourth aspect and the fifth aspect are not repeatedly described here.

BRIEF DESCRIPTION OF THE DRAWINGS

In order to describe the technical solutions in the embodiments of the present application more clearly, a brief introduction regarding the accompanying drawings that need to be used for describing the embodiments or exemplary technology is given below; it is obvious that the accompanying drawings described below are only some embodiments of the present application, the person of ordinary skill in the art may also obtain other drawings according to these drawings without paying creative labor.

FIG. 1 is a schematic diagram of an architecture of a system according to one embodiment of the present application;

FIG. 2 is a schematic flowchart of a network connection method according to one embodiment of the present application;

DETAILED DESCRIPTION OF EMBODIMENTS

Figure 3:
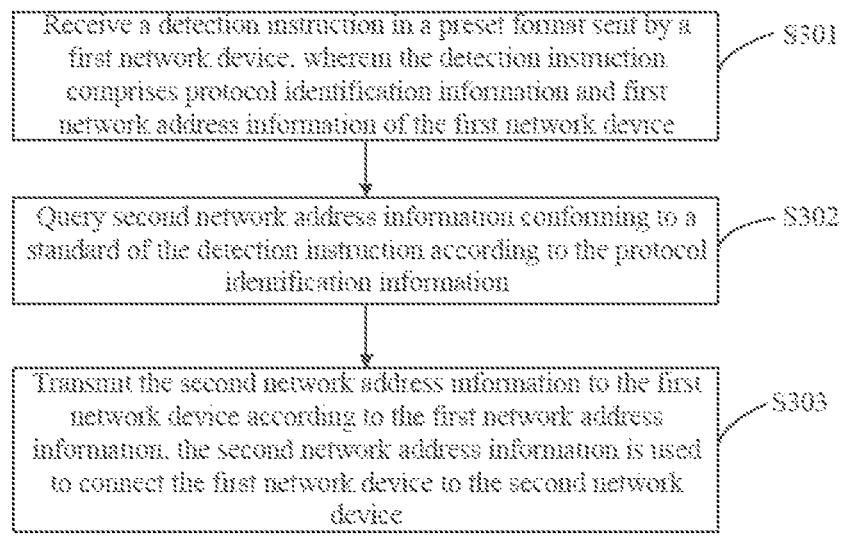
FIG. 3 is a schematic flowchart of a network connection method according to another embodiment of the present application.

In the following descriptions, in order to describe but not intended to limit the present application, concrete details such as specific system structure, technique, and the like are proposed to facilitate a comprehensive understanding of the embodiments of the present application. However, it is apparent to the ordinarily skilled one in the art that, the present application can also be implemented in some other embodiments without the description of these concrete details. In some other conditions, detailed explanations of the method, the circuit, the device and the system well known to the public are omitted, so that unnecessary details which are disadvantageous for understanding of the description of the present application may be avoided.

In order to describe the technical solutions of the present application, the technical solutions are described with reference to the accompanying figures and the embodiments below:

A connection method for a network device provided by the embodiments of the present application may be applied to a terminal device such as a mobile phone, a tablet computer, a wearable device, a vehicle-mounted device, an augmented reality (Augmented Reality, AR) and/or virtual reality (Virtual Reality, VR) device, a notebook computer, an ultra-mobile personal computer (Ultra-mobile Personal Computer, UMPC), a netbook, a personal digital assistant (Personal Digital Assistant, PDA), etc., and the specific type of the terminal device is not limited in the embodiments of the present application.

Referring to FIG. 1, FIG. 1 illustrates a schematic diagram of an architecture of a system according to one embodiment of the present application, the architecture of the system includes a detection device 10 and a first network device 20, the detection device 10 is connected to the first network device 20 in a wired or wireless manner; or the detection device 10 is arranged on the first network device 20 and is integrated into the first network device 20 as a part of the first network device 20.

As shown, the detection device 10 includes a controller 11, an memory 12, an optical signal modem 13, an optical signal receiver 14, a directional optical signal transmitter 15, a radio frequency (Radio Frequency, RF) signal modem 16, and a RF signal transceiver 17.

The controller 11 is configured to receive a detection instruction from the first network device 20, and transmit the detection instruction to the optical signal modem 13 or the RF signal modem 16, so that the optical signal modem 13 or the RF signal modem 16 performs signal modulation to obtain a modulated signal of the detection instruction. Furthermore, in some embodiments, when the detection device is a part of the network device configured for receiving the detection instruction, the detection device is further configured to receive the detection instruction which is obtained by demodulating the modulated signal from other device by the optical signal modem 13 or the RF signal modem 16, the detection device is further configured to query the network address information of the network device from the memory 12 according to the detection instruction, and feedback the network address information to other network device which transmits the detection instruction through the Internet. The controller 11 may be a central processing unit (Central Processing Unit, CPU) chip, or be a micro processor unit (Micro Processor Unit, MCU) control chip, or be a CPU of the network device.

The optical signal modem 13 is configured to receive a detection instruction sent by the controller 11 and perform an optical modulation on the detection instruction to obtain a directional optical signal, and transmit the directional optical signal to the directional optical signal transmitter 15. In some embodiment, when the detection device is a part of the network device configured for receiving the detection instruction, the optical signal modem 13 is further configured to receive a modulated signal received by the optical signal receiver 14, demodulate the modulated signal to obtain a demodulated detection instruction, and transmits the demodulated detection instruction to the controller 11. The optical signal modem 13 may be a signal modem chip which cooperates with a driving circuit so as to implement modulation of the detection instruction and drive the directional optical signal transmitter 15 to transmit the directional optical signal; the optical signal modem 13 may also cooperate with a signal amplification and filtering circuit so as to demodulate the detection instruction received by the optical signal receiver 14.

The optical signal receiver 14 is configured to receive a detection instruction in a directional optical signal format from another network device, and transmit the detection instruction in the format of directional optical signal to the optical signal modem 13 to be demodulated. The optical signal receiver 14 is an optical signal receiving device based on a photoelectric inductive film, and the photoelectric inductive film may be transparent, translucent, or opaque film, and may be integrated on a housing or a screen of the device. The photoelectric inductive film may include a first transparent conductive layer, a photoelectric conversion layer, and a second conductive layer. The photoelectric conversion layer is arranged between the first transparent conductive layer and the second conductive layer. A directional optical signal is detected by a current generated by a light beam on the photoelectric inductive film, that is, a current detection component is used to detect the current between the first transparent conductive layer and the second conductive layer, then, the directional optical signal is detected by an Analog-to-Digital converter.

The directional optical signal transmitter 15 is configured to receive the detection instruction modulated by the optical signal modem 13, and transmit the modulated detection instruction to another network device in a format of directional optical signal. The directional optical signal transmitter 15 may be a laser diode, an LED light source, or be a device that can emit a directional visible light signal or a directional infrared signal.

The RF signal modem 16 is configured to: receive the detection instruction sent by the controller 11, modulate the detection instruction, and transmit the modulated detection instruction to the RF signal transceiver 17. Furthermore, in some embodiment, the RF signal modem 16 is further configured to: receive a modulated signal of a detection instruction received by the RF signal transceiver 17 from other network device, demodulate the modulated signal and transmit the demodulated signal to the controller 11. The RF signal modem 16 is a RF signal modem chip, which cooperates with a driving circuit to transmit the RF signal through the RF signal transceiver 17; as an alternative, the RF signal modem chip cooperates with a signal amplification and filtering circuit so as to demodulate the detection instruction of the other network device received by the RF signal transceiver 17.

The RF signal transceiver 17 is configured to receive the detection instruction modulated by the RF signal modem 16, and transmit the detection instruction to other network device in a format of RF signal; furthermore, the RF signal transceiver 17 is further configured to: receive a detection instruction in a format of RF signal sent by other network device, and transmit the detection instruction in the format of RF signal to the RF signal modem 16 to be demodulated. The RF signal transceiver may be a RF antenna.

The memory 12 is configured to store a network address of the network device, network protocols provided for connecting to other network devices, and ports corresponding to the network protocols, so that the controller 11 may query the network address information according to the ports. The memory 12 also stores query information of the network device, such as an account number, an identity, content retrieval, and the like. The memory 12 may be a storage medium such as a memory chip, a magnetic disk, or the like.

It needs to be noted that the detection device may include some or all of the aforesaid modules according to functional requirements.

FIG. 2 depicts a schematic flowchart of a connection method of a network device according to the present application, network address information of other network devices in the surrounding environment can be detected by the network device according to the connection method, so that an interconnection communication between the network devices can be realized. Where the network device accesses the Internet, and stores the network address of the network device, a network protocol that allows other network devices to connect to the network device, and a port corresponding to the network protocol into a memory chip or a magnetic disk (i.e., the memory in the embodiment described above). As shown in FIG. 2, the method includes:

At step S201, the detection instruction is transmitted to a second network device in a preset format, where the detection instruction includes protocol identification information and first network address information of the first network device, and the detection instruction is used to instruct the second network device to query second network address information conforming to a standard of the detection instruction according to the protocol identification information.

In one preferable embodiment, the first network device is a device integrated with a network detection module, or the first network device is a device connected to the network detection module in a wired or wireless manner. The detection instruction includes first network address information of the first network device and protocol identification information of a network protocol to be detected; the first network address information includes a network address and a port configured to receive feedback information; and the protocol identification information of the network protocol to be detected may be a specific network protocol, or be a combination of a plurality of network protocols, or be a group of all supported network protocols.

In particular, the network address of the first network device is an IP (Internet Protocol) address of the network device; the protocol identification information is used to identify an Internet protocol supported by the network device, such as HTTP, FTP, and an network application program specialized protocol; the port configured to receive the feedback information is a port number of the first network device that is prepared for receiving the feedback information, and may be any port.

For example, the detection device provided in this embodiment is connected to the network device A, the network device B, and the network device C through USB data lines, respectively. The IP address of the network device A is 202. 96. 209. 1; the IP address of the network device B is 202. 96. 209. 2; the IP address of the network device C is 202. 96. 209. 3.

Where the network protocols supported by the network device B are shown in Table one below:

TABLE ONE

| Address | Protocol | Port | Remarks |
| --- | --- | --- | --- |
| 202.96.209.2 | http | 8888 | Local |
| 202.96.209.2 | x_app | 4567 | Local, x_app program specialized protocol |
| 102.56.233.8 | ftp | 21 | Remote server |

The network protocols supported by the network device C are shown in Table two below:

TABLE TWO

| Address | Protocol | Port | Remarks |
|---|---|---|---|
| 202.96.209.3 | http | 5555 | Local |
| 202.96.209.3 | x_app | 2345 | Local, x_app program specialized protocol |
| 202.96.209.3 | y_app | 4567 | Local, x_app program specialized protocol |
| 202.96.209.3 | ftp | 21 | Local |

For example, a detection instruction of the network device A may be "feedback IP address: 202. 96. 209. 1; feedback port: 1234; detection protocol: FTP", the network device A transmits the detection instruction to the controller of the detection device, the detection protocol of FTP indicates that the a network device that supports the FTP protocol only needs to be detected in the current detection task. If the detection protocol is "FTP, HTTP", it indicates that a network device that supports a FTP protocol or an HTTP protocol needs to be detected in the current detection task. If the detection protocol is "all", it indicates that all protocols supported by the network device needs to be detected in the current detection task, for example, all protocols supported by the network device B are HTTP protocol, x_app protocol, and FTP protocol.

It needs to be noted that one, or a plurality of or even all Internet protocols may be requested to be detected according to the detection instruction; the second network device may be one or a plurality of network devices, and the first network device may transmit the detection instruction to the plurality of network devices simultaneously; the second network address information may be network address information stored in the second network device or be the network address information of the second network device, a plurality of network address information may be stored in the second network device, and the network address information conforming to the standard of the detection instruction is queried according to the protocol identification information; and the network address and the port may be a network address and a port of a local network device, or be a network address and a port of a remote server that supports the network protocol.

In one embodiment, before transmitting the detection instruction to the second network device in the preset format, the method further includes: performing an optical modulation on the detection instruction to obtain a modulated directional optical signal; and/or performing a radio frequency (Radio Frequency, RF) modulation on the detection instruction to obtain a modulated RF signal.

In one preferable embodiment, the controller transmits the detection instruction to the optical signal modem, so that the optical signal modem performs the optical modulation on the detection instruction; or the controller transmits the detection instruction to the RF signal modem, so that the RF signal modem performs the RF modulation on the detection instruction.

For example, the controller of the network device A transmits a detection instruction "feedback IP address: 202. 96. 209. 1; feedback port: 1234; detection protocol: FTP" to the optical signal modem or the RF signal modem to be modulated. The detection instruction may also include multiple or all protocols.

In one preferable embodiment, said transmitting the detection instruction in the preset format to the second network device includes: transmitting a directional optical signal corresponding to the detection instruction to the second network device; and/or transmitting the RF signal corresponding to the detection instruction to the second network device.

In one preferable embodiment, the detection instruction may be modulated by the optical signal modem to obtain the directional optical signal, and the directional optical signal is sent to the optical signal receiver of another network device through the directional optical signal transmitter; as an alternative, the RF signal modem performs RF modulation on the detection instruction to obtain a RF signal, and transmits the RF signal to the RF signal transceiver of each of the plurality of network devices within an effective signal coverage through the RF signal transceiver.

For example, the optical signal modem of the network device A modulates the detection instruction of "feedback IP address: 202. 96. 209. 1; feedback Port: 1234; detection Protocol: FTP", and then transmits the modulated signal to the network device B through the directional optical signal transmitter; as an alternative, the RF signal modem of network device A modulates a detection instruction of "feedback IP Address: 202. 96. 209. 1; feedback port: 1234; detection protocol: FTP", and then transmits the modulated signal to the network device B and the network device C through the RF signal transceiver. The detection instruction may also include multiple or all protocols.

It needs to be noted that, after receiving the modulated signal, the second network device demodulates the modulated signal to obtain a demodulated detection instruction, and queries the second network address information conforming to the standard of the detection instruction from the memory of the detection device according to the network protocol identification information in the demodulated detection instruction; where the second network address information includes a network address and an port of the second network device, and the second network address information is used as feedback information.

In one embodiment, the detection instruction includes screening information, and the second network device stores the query information; said receiving the second network address information fed back by the second network device according to the first network address information includes: receiving, through a network, the second network address information fed back by the second network device according to the first network address information when the query information conforms to the screening information.

In one preferable embodiment, the screening information is used to screen the network protocol that conforms to the standard of the detection instruction, and the query information may be taken as the query information used as an identifier related to the second network address information of the second network device. For example, the query information may be an account, an identity, content retrieval, or the like, and a corresponding network device of the query information that satisfies the screening information can feedback the detection instruction.

For example, the ID information of the x_app protocol of the network device B is "ABC", the ID information of the x_app protocol of the network device C is "XYZ", and the network device A adds an ID screening condition of "any ID which starts by a" in a detection instruction for detecting the x_app protocol, then, the network device B will feedback an IP address and a port number of the x_app protocol to the network device A, however, the network device C does not feedback an IP address and a port number. For another example, a webpage provided by the HTTP protocol of the network device B includes a content of "decoration", and a webpage provided by the HTTP protocol of the device C does not include any content related to "decoration", and the network device A adds a screening condition of a keyword "decoration" in the detection instruction for detecting the HTTP protocol, then, the network device B will feedback the IP address and the port number of the HTTP protocol to the device A, however, the network device C will not feedback the IP address and the port number of the HTTP protocol.

In one preferable embodiment, the first network device is used to transmit the modulated signal to the second network device, or the detection device of the first network device is used to transmit the modulated signal to the detection device of the second network device. In particular, the modulated signal may be sent to the second network device in the form of directional optical information, the modulated signal may also be sent to the second network device in the form of RF signal.

For example, the modulated signal is transmitted in the form of directional optical signal to the optical signal receiver of the second network device through the directional optical signal transmitter; as an alternative, the modulated signal is transmitted in the form of RF signal to the RF signal transceiver of each of the plurality of network devices in the effective signal coverage through the RF signal transceiver.

At step S202, the second network address information fed back by the second network device is received according to the first network address information, and connecting to the second network device according to the second network address information.

In one preferable embodiment, the first network device receives network address information fed back by the second network device through the network according to the first network address information.

In particular, the second network device feeds back the second network address information to the first network device from which the detection instruction is sent out through the network, according to the network address and the feedback port in the detection instruction.

For example, the controller of the network device B receives the detection instruction "feedback IP address: 202. 96. 209. 1; feedback port: 1234; detection protocol: FTP", determines that the IP address of the FTP protocol is 102. 56. 233. 8 and the port is 21 by querying in the memory, and generates network address information that needs to be fed back according to the IP address and the port, and then feedback the generated network address information to the network device A with the IP address 202. 96. 209. 1 and the port 1234. For another example, the controller of network device C receives a detection instruction "feedback IP address: 202. 96. 209. 1; feedback port: 1234; detection protocol: FTP", and determines that the IP address of the FTP protocol is 202. 96. 209. 3, and the port is 21, and generates the network address information that needs to be fed back according to the IP address and the port, and then fed back the generated network address information to the network device A having the IP address 202. 96. 209. 3 and the port of 1234. The detection instruction may also include multiple or all protocols, and the IP addresses and the port numbers of the multiple or all protocols are included in the network address information to be fed back, and then are fed back to the network device A.

In one preferable embodiment, after receiving the network address information fed back by the second network device through the network, the first network device is connected to one or a plurality of network device(s) through an network application program according to the network address(es) and the port(s) corresponding to the network protocol in the network address information.

For example, after receiving the network address information fed back from the second network device, the network device A may determine that the IP address of the FTP protocol of the network device B is 102. 56. 233. 8, and the port is 21, and then connect to a FTP service of the network device B using a FTP software; the FTP service is actually provided by the remote server. The network device A may also determine that the IP address of the FTP protocol of the network device C is 202. 96. 209. 3, and the port is 21, and then connects to the FTP service of the network device C using the FTP software, the FTP service is actually provided by the network device C itself. The network device A may also detect the IP addresses and the ports of the HTTP network protocol, the x_app network protocol, and the y_app network protocol of the network device B or the network device C, and then connects to the network device B or the network device C using a software corresponding to the HTTP network protocol, or the x_app network protocol, or the y_app network protocol.

In this embodiment, the network device can obtain network address information of other network devices by only sending an unidirectional modulated signal under the condition that other network devices are unknown, as a result, not only the network address information of the local network device can be obtained, the network address information of the remote server supported by the network protocol can also be obtained, so that these network devices can be conveniently connected through the network application, and interaction along these network devices is further realized.

Referring to FIG. 3, FIG. 3 is a schematic flowchart of a connection method for a first network device 20 according to another embodiment of the present application, a second network device is taken as an executive subject on the other side, and performs a corresponding querying process after receiving a detection instruction from the first network device 20, thereby feeding back the corresponding network address information to the first network device 20 through the network to realize interconnection and communication between the first network device 20 and the second network device on both sides. As shown in FIG. 3, this method includes:

At step S301, a detection instruction in a preset format sent by the first network device 20 is received, where the detection instruction includes protocol identification information and first network address information of the first network device.

In one preferable embodiment, the second network device receives a detection instruction in the preset format sent by the first network device, and the detection instruction in the preset format is a detection instruction modulated by the first network device.

In particular, the detection instruction may be modulated by an optical signal modem or a RF signal modem of the first network device 20, so that a modulated signal is obtained, and the modulated signal is sent by a directional optical signal transmitter or a RF signal transceiver to the second network device. An optical signal receiver or a RF signal transceiver of the second network device receives the modulated signal, and transmits the modulated signal to the optical signal modem or the RF signal modem of the second network device to be demodulated, then, the demodulated signal is transmitted to a controller of the second network device.

For example, after receiving the directional optical signal sent by the network device A, the optical signal receiver of the network device B transmits the directional optical signal to the optical signal modem which demodulate the directional optical signal to obtain the detection instruction "feedback IP address: 202. 96. 209. 1; feedback port: 1234; detection protocol: FTP", and transmits the detection instruction to the controller of the network device B; as an alternative, after receiving the RF signal sent by the network device A, the RF signal transceivers of the network device B and the network device C transmit the RF signal to the RF signal modems of the network device B and the network device C, and the RF signal modems of the network device B and the network device C demodulate the RF signal to obtain the detection instruction "feedback IP address: 202. 96. 209. 1; feedback port: 1234; detection protocol: FTP", and transmit the detection instruction to their respective controllers (i.e., the controller of the network device B and the controller of the network device C), respectively.

In one embodiment, said receiving the detection instruction in the preset format sent by the first network device includes: receiving a directional optical signal sent by the first network device and being corresponding to the detection instruction; and/or receiving a RF signal sent by the first network device and being corresponding to the detection instruction.

In one preferable embodiment, an optical signal receiver of a detection device configured in the second network device, that is, the optical signal receiving device based on a photoelectric inductive film, is configured to receive the directional optical signal sent by the first network device; in particular, the directional optical signal is sent by the directional optical signal transmitter configured in the first network device to the optical signal receiver configured in the second network device.

A RF signal transceiver of the detection device configured in the second network device, that is, a RF antenna, etc., is configured to receive the RF signal sent by the first network device; in particular, the RF signal is sent by the RF signal transceiver configured in the first network device to the RF signal transceiver configured in the second network device.

In one embodiment, after receiving the detection instruction in the preset format sent by the first network device, the method further includes: demodulating the directional optical signal to obtain a demodulated detection instruction; and/or demodulating the RF signal to obtain the demodulated detection instruction.

In one preferable embodiment, the second network device may demodulate the detection instruction through the optical signal modem or the RF signal modem, that is, the detection instruction in the form of directional optical signal is demodulated by the optical signal modem, and the detection instruction in the form of RF signal is demodulated by the RF signal modem to obtain the demodulated signal (i.e., the demodulated detection instruction).

At step S302, second network address information conforming to the standard of the detection instruction is queried according to the protocol identification information.

In one preferable embodiment, the second network device queries the network address and the port conforming to the standard of the detection instruction from the memory according to the demodulated signal (i.e., the network protocol identification information in the demodulated detection instruction), and generates the second network address information to be fed back.

For example, the controller of the network device B receives the detection instruction "feedback IP address: 202. 96. 209. 1; feedback port: 1234; detection protocol: FTP", and determines that the IP address conforming to the FTP protocol is 102. 56. 233. 8, and the port conforming to the FTP protocol is 21 by querying in the memory, and generates network address information according to the IP address and the port conforming to the FTP protocol. The controller of the network device C receives the detection instruction "feedback IP address: 202. 96. 209. 1; feedback port: 1234; detection protocol: FTP", and determines that the IP address conforming to the FTP protocol is 202. 96. 209. 3, and the port conforming to the FTP protocol is 21 by querying in the memory, and generates network address information according to the IP address and the port conforming to the FTP protocol. The detection instruction may also include multiple protocols or all protocols, and the IP address and the port number of multiple protocols or all protocols are included in the network address information.

It needs to be noted that, the detection instruction includes receiving a network address (i.e., the network address of the first network device) in the feedback information, receiving network protocol identification information (i.e., the network protocol that needs to be detected), and the port number (i.e., the port number of the first network device) in the feedback information.

Said querying second network address information conforming to the standard of the detection instruction according to the protocol identification information includes: querying a network address, a network protocol, and port information of the second network device according to the protocol identification information.

For example, if the controller of the network device B receives a detection instruction of "feedback IP address: 202. 96. 209. 1; feedback port: 1234; detection protocol: FTP", this controller may determine that the IP address conforming to the FTP protocol is 102. 56. 233. 8 and the port conforming to the FTP protocol is 21 by querying in the memory, and generates the network address information according to the IP address and the port conforming to the FTP protocol. For another example, if the controller of the network device C receives the detection instruction of "feedback IP address: 202. 96. 209. 1; feedback port: 1234; detection protocol: FTP", this controller may determine that the IP address conforming to the FTP protocol is 202. 96. 209. 3 and the port conforming to the FTP protocol is 21 by querying in the memory, and generates the network address information according to the IP address and the port conforming to the FTP protocol.

At step S303, the second network address information is transmitted to the first network device according to the first network address information, where the second network address information is used to connect the first network device to the second network device.

In one preferable embodiment, the second network device feeds back the second network address information to the network device (i.e., the first network device) which sends out the detection instruction through the Internet according to the network address and the feedback port number in the detection instruction.

For example, the controller of the network device B receives a detection instruction of "feedback IP address: 202. 96. 209. 1; feedback port: 1234; detection protocol: FTP", and determines that the IP address conforming to the FTP protocol is 102. 56. 233. 8 and the port conforming to the FTP protocol is 21 by querying in the memory, and generates the network address information according to the IP address and the port conforming to the FTP protocol, and then feeds back the network address information to the network device A having the IP address of 202. 96. 209. 1 and the port of 1234. The controller of the network device C receives the detection instruction "feedback IP address: 202. 96. 209. 1; feedback port: 1234; detection protocol: FTP", and determines that the IP address conforming to the FTP protocol is 202. 96. 209. 3 and the port conforming to the FTP protocol is 21 by querying in the memory, and generates the network address information according to the IP address and the port conforming to the FTP protocol, and then feeds back the network address information to the network device A having the IP address of 202. 96. 209. 1 and the port of 1234. The detection instruction may also include multiple protocols or all protocols, the IP addresses and the port numbers of the multiple protocols or all protocols are included in the feedback information; then, these IP addresses and the port numbers are fed back to the network device A.

In one embodiment, the detection instruction includes screening information, and the second network device stores query information; said transmitting the second network address information to the first network device according to the first network address information includes: transmitting the second network address information to the first network device through the network according to the first network address information when the query information conforms to the screening information.

In particular, the memory further stores query information of the network device, such as an account, an ID, and content retrieval; the detection instruction further includes screening information; and the network device which meets the screening information can only feedback the detection instruction.

For example, the ID information of the x_app protocol of the network device B is "ABC", the ID information of the x_app protocol of the network device C is "XYZ", and the network device A adds an ID screening condition of "any ID which starts by a" in a detection instruction for detecting the x_app protocol, then, the network device B will feedback an IP address and a port number of the x_app protocol to the network device A, however, the network device C does not feedback an IP address and a port number. For another example, a webpage provided by the HTTP protocol of the network device B includes a content of "decoration", and a webpage provided by the HTTP protocol of the device C does not include any content related to "decoration", and the network device A adds a screening condition of a keyword "decoration" in the detection instruction for detecting the HTTP protocol, then, the network device B will feedback the IP address and the port number of the HTTP protocol to the device A, however, the network device C will not feedback the IP address and the port number of the HTTP protocol.

According to this embodiment, under the condition that other network devices are unknown, network address information of other network devices can be obtained by only sending an unidirectional detection instruction, not only the network address information of the local network device can be obtained, the network address information of the remote server supported by the network protocol can also be obtained, so that the network devices can be conveniently connected through network applications, and interaction among these network devices is further realized.

It should be understood that, the values of serial numbers of the steps in the aforesaid embodiments do not indicate a sequencing of execution sequences of the steps, the execution sequences of the steps should be determined by functionalities and internal logic of the steps, and shouldn't be regarded as limitation to an implementation process of the embodiment of the present application.

Figure 4:
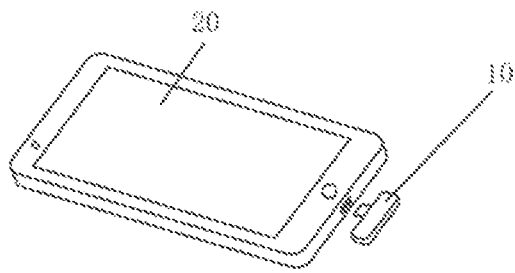
FIG. 4 is a schematic diagram of an application scenario of the network connection method according to one embodiment of the present application.

FIG. 4 is a schematic diagram of an application scenario of a connection method for a first network device 20 according to one embodiment of the present application, as shown in FIG. 4, a detection device 10 is connected to the first network device 20 through a data line or in a wireless connection manner. In particular, the data line may be a USB, a lightning interface, or the like, and the wireless connection may be Bluetooth, or the like.

Figure 5:
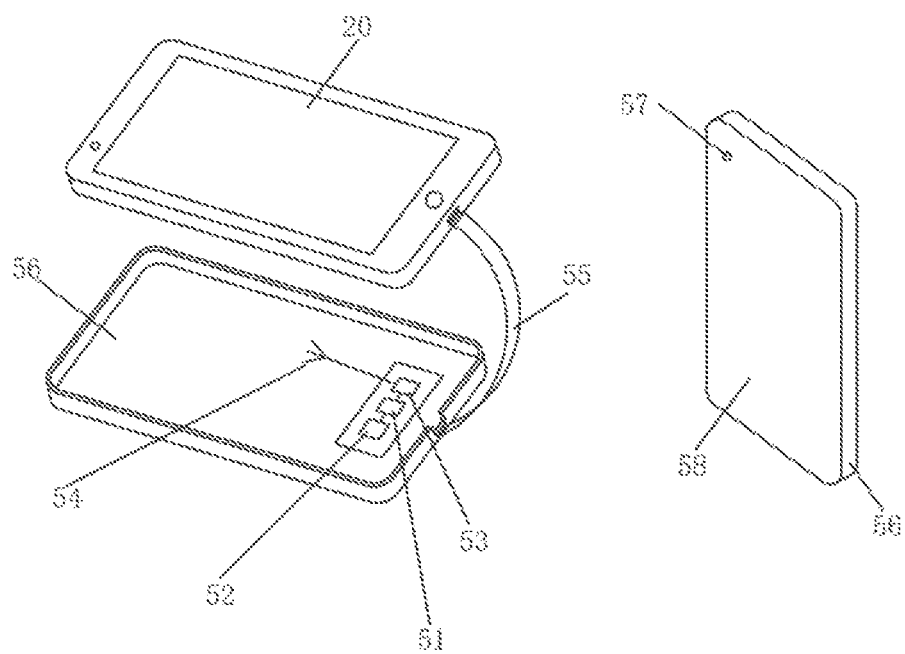
FIG. 5 is a schematic diagram of an application scenario of the network connection method according to another embodiment of the present application.

Referring to FIG. 5, FIG. 5 is a schematic diagram of an application scenario of the connection method for the first network device 20 according to one embodiment of the present application, as shown in FIG. 5, a detection device may be mounted on a housing 56 of the first network device 20 and is connected to the first network device 20 through a data line or in a wireless connection manner. In particular, a photoelectric inductive film 58 is integrated on an outer surface of the housing 56 of the first network device 20, and is used as an optical signal receiver; moreover, the integrated laser transmitter or the LED light source are integrated on the first network device 20 and is used as the directional optical signal transmitter 62; the integrated controller 51, the optical signal modem 52, the RF modem 53, and the RF antenna 54 are integrated into the housing 56 of the first network device 20, and are connected to the first network device 20 through the data line 55 or Bluetooth. Where the first network device 20 may be a portable network device.

Figure 6:
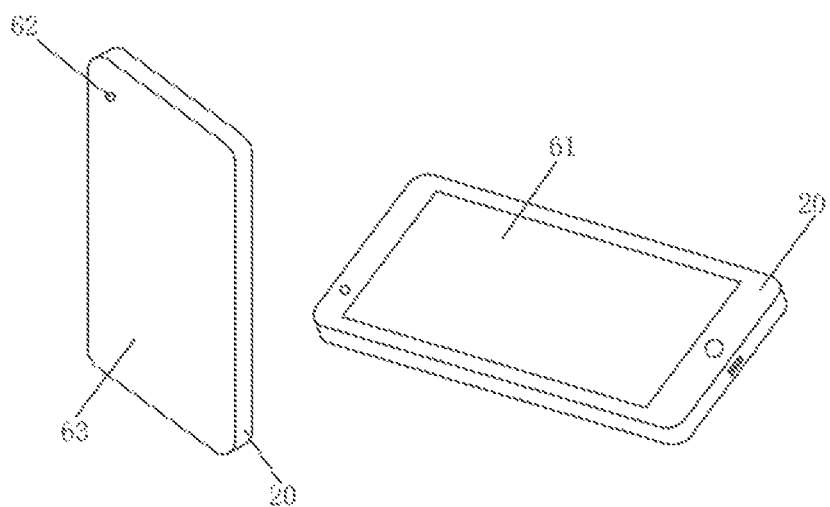
FIG. 6 is a schematic diagram of an application scenario of the network connection method according to another embodiment of the present application.

FIG. 6 is a schematic diagram of an application scenario of the connection method for the first network device 20 according to one embodiment of the present application. A photoelectric inductive film 63 is integrated on the housing of the first network device 20 and is used as an optical signal receiver, and a transparent photoelectric inductive film 61 may also be integrated on a screen of the first network device 20 and is used as an optical signal receiver; a laser emitter or an LED light source is integrated on the first network device 20 and is used as a directional optical signal transmitter 62; and an integrated controller, an optical signal modem, a RF modem and a RF antenna are integrated in the first network device 20 (as shown in FIG. 5).

For example, the optical signal receiver is an optical signal receiving device based on a photoelectric inductive film, and the photoelectric inductive film may be transparent, translucent, or opaque, and is integrated on a housing or a screen of the first network device 20. The photoelectric induction film includes a first transparent conductive layer, a photoelectric conversion layer and a second conductive layer, where the photoelectric conversion layer is arranged between the first transparent conductive layer and the second conductive layer; and a directional optical signal is detected by a current generated by emitting a light beam on the photoelectric induction film, that is, a current detection element between the first transparent conductive layer and the second conductive layer is used to detect the current, and then, a directional optical signal is detected through an analog to digital conversion (Analog to Digital Conversion, ADC) module.

Where the first transparent conductive layer may be a transparent metal film, or be a transparent metal oxide film, or be a transparent graphene film, or be a carbon nanotube film or be a transparent film made from a conductive polymer material.

The second conductive layer may be an opaque, translucent or transparent conductive layer; the second conductive layer may be a metal film, or be a metal oxide film, or be a graphene film, or be a carbon nanotube film, or be a film made from the conductive polymer material.

The photoelectric conversion layer has a capability of photoelectric conversion, for example, the photoelectric conversion layer is a film made of a semiconductor photovoltaic material.

An opaque or semi-transparent semiconductor photovoltaic material may be used as the photoelectric conversion layer in the photoelectric induction film, these opaque or semi-transparent semiconductor photovoltaic materials may be, such as the photoelectric conversion layers based on monocrystalline silicon, polysilicon, amorphous silicon, cadmium telluride, copper indium gallium selenium, copper zinc tin sulfur, copper zinc tin selenium, copper indium selenium, gallium arsenide, organic semiconductors and perovskite, and are completely opaque or partially transparent in visible light range. The photoelectric inductive film may be attached on the surface of the first network device 20, for example, the photoelectric inductive film may be attached on an outer surface of a mobile device, or a notebook computer, or a server, so that the surface of the network device becomes a receiver of the directional optical signal.

The photoelectric inductive film may also use a transparent conductive layer as the first transparent conductive layer and the second conductive layer, the transparent conductive layer may be such as a transparent conductive layer based on metal silver, or be a grid-shaped transparent conductive layer (e.g., ITO, FTO) based on metal silver wire, or be a $Z_nO$ based transparent conductive layer, or be a grid-shaped transparent conductive layer based on metal copper wire, or be a transparent conductive layer based on silver nanowire, or be a transparent conductive layer based on graphene, or be a transparent conductive layer based on graphene, or be a transparent conductive layer based on conductive polymer (3,4-ethylenedioxythiophene)-poly (styrene sulfonic acid) (PEDOT:PSS); the photoelectric induction film can also use a transparent semiconductor photovoltaic material as the photoelectric conversion layer; for example, a photoelectric conversion layer based on aluminum phthalocyanine and carbon 60, a conductive polymer and fullerene PBDTT-DPP and PCBM, and a perovskite film is used as the photoelectric conversion layer, and the photoelectric conversion layer has high light transmittance in the range of visible light. The photoelectric inductive film has high transparency performance, can be attached on the surface of the network device, and does not significantly influence the appearance of the first network device 20, such as a mobile device, a notebook computer, a display screen of the server, and a surface of the network device that needs to be transparent.

Figure 7:
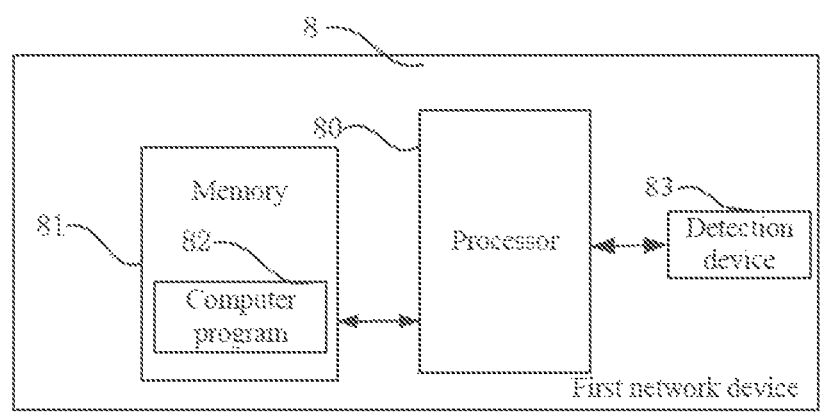
FIG. 7 is a schematic block diagram of the first network device according to one embodiment of the present application.

FIG. 7 is a schematic structural diagram of a network device 8 provided by one embodiment of the present application. As shown in FIG. 7, the network device 8 in this embodiment includes: at least one processor (only one processor is shown in FIG. 8), a memory 81 and a computer program 82 stored in the memory 81 and executable by the at least one processor 80, the network device 8 further includes a detection device 83, the processor 80 is configured to implement the steps in the connection method for the network device 8, including:

receiving, by a second network device, a detection instruction in a preset format from the network device 8, where the detection instruction includes protocol identification information and first network address information of the network device 8;

querying second network address information conforming to a standard of the detection instruction by the second network device according to the protocol identification information;

transmitting, by the second network device, the second network address information to the first network device according to the first network address information to enable the network device 8 to connect to the second network device according to the second network address information.

In one preferable embodiment, said receiving, by the second network device, the detection instruction in the preset format from the first network device includes:

receiving a directional optical signal corresponding to the detection instruction from the first network device by the second network device; and/or, receiving a radio frequency signal corresponding to the detection instruction from the first network device by the second network device.

In one preferable embodiment, after said receiving, by the second network device, the detection instruction in the preset format from the first network device, the method further includes:

demodulating the directional optical signal to obtain a demodulated detection instruction by an optical signal modem of the second network device; and/or, demodulating the radio frequency signal to obtain a demodulated detection instruction by a radio frequency modem of the second network device.

In one preferable embodiment, the method further comprises:

receiving, by an optical signal receiver or a radio frequency signal transceiver in a detection device of the second network device, a modulated signal in a form of directional optical signal or in a form of radio frequency signal and transmitting the modulated signal to the optical signal modem or the radio frequency signal modem of the second network device to be demodulated, and transmitting a demodulated signal from the optical signal modem or the radio frequency signal modem of the second network device to a controller of the second network device;

where the modulated signal is obtained by modulating the detection instruction through an optical signal modem or a radio frequency signal modem of the first network device, and is transmitted to the second network device through a directional optical signal transmitter or a radio frequency signal transceiver of the first network device.

In one preferable embodiment, the directional optical signal receiver in the detection device of the second network device is an optical signal receiver based on photoelectric inductive film and is configured to receive a directional optical signal sent by the first network device;

the radio frequency signal transceiver in the detection device of the second network device is a signal transceiver such as a radio frequency antenna, and is configured to receive a radio frequency signal sent by the first network device.

In one preferable embodiment, the detection instruction includes screening information, and the second network device stores query information;

said transmitting, by the second network device, the second network address information to the first network device according to the first network address information includes:

transmitting, by the second network device, the second network address information to the first network device through a network according to the first network address information, when the query information conforms to the screening information.

In one preferable embodiment, said querying, by the second network device, the second network address information conforming to the standard of the detection instruction according to the protocol identification information comprises:

querying a network address, a network protocol and port information of the second network device according to the protocol identification information from a memory of the detection device by the second network device.

The network device 8 can be a computing device such as a desktop computer, a laptop computer, a palm computer, a cloud server, etc. The network device 8 can include but is not limited to: a processor 80, the memory 81. A person of ordinary skill in the art can understand that, FIG. 8 only illustrates an example of the network device 8, but should not be constituted as limitation to the network device 8, more or less components than the components shown in FIG. 8 may be included; as an alternative, some components or different components may be combined; for example, the network device 8 can also include an input and output device, a network access device, etc.

The so-called processor 80 may be CPU, and can also be other general purpose processor, digital signal processor (Digital Signal Processor, DSP), application specific integrated circuit (Application Specific Integrated Circuit, ASIC), field-programmable gate array (Field-Programmable Gate Array, FGPA), or some other programmable logic devices, discrete gate or transistor logic device, discrete hardware component, etc. The general purpose processor may be a microprocessor, as an alternative, the processor can also be any conventional processor, and the like.

The memory 81 may be an internal storage unit of the network device 8, such as a hard disk or a memory of the network device 8. The memory 81 may also be an external storage device of the network device 8, such as a plug-in hard disk, a smart media card (Smart Media Card, SMC), a secure digital (Secure Digital, SD) card, a flash card (Flash Card, FC) equipped on the network device 8. Furthermore, the memory 81 may not only include the internal storage unit of the network device 8, but also include the external memory of the network device 8. The memory 81 is configured to store an operating system, an application program, a BootLoader, data and other procedures such as program codes of a computer program. The memory 81 can also be configured to store data that has been output or being ready to be output temporarily.

A computer readable storage medium is further provided in one embodiment of the present application, where the computer readable storage medium stores a computer program, that, when being executed by a processor, causes the processor to implement the steps in the various method embodiments.

One embodiment of the present application further provides a computer program product, that, when being executed on a mobile terminal device, causes the mobile terminal device to implement the steps in the various method embodiments.

When the integrated unit is achieved in the form of software functional units, and is sold or used as an independent product, the integrated unit may be stored in a computer readable storage medium. Based on this understanding, a whole or part of flow process for implementing the method in the embodiments of the present application can also be accomplished in the manner of using computer program to instruct relevant hardware. When the computer program is executed by the processor, the steps in the various method embodiments described above may be implemented. Wherein, the computer program comprises computer program codes, which may be in the form of source code, object code, executable documents or some intermediate form, etc.

In the aforesaid embodiments, the descriptions of the embodiments are emphasized respectively, regarding the part of an embodiment which isn't described or disclosed in detail, reference can be made to relevant descriptions in some other embodiments.

A person of ordinary skill in the art may be aware of that, the elements and algorithm steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

In some embodiments disclosed in the present application, it should be understood that, the disclosed first network device, second network device and the connection methods may be implemented by using other approaches.

The embodiments described above are only intended to explain but not to limit the technical solutions of the present application. Although the present application has been explained in detail with reference to these embodiments, a person of ordinary skilled in the art can understand that, the technical solutions disclosed in the embodiments can also be amended, some technical features in the technical solutions can also be equivalently replaced; the amendments or the equivalent replacements don't cause the essence of the corresponding technical solutions to be deviated from the spirit and the scope of the technical solutions in the embodiments of the present application, and thus should all be included in the protection scope of the present application.

What is claimed is:

1. A network connection method, comprising:
   transmitting, by a first network device, a detection instruction in a preset format to a second network device to instruct the second network device to query second network address information conforming to a standard of the detection instruction from a memory of a detection device according to protocol identification information, wherein the detection instruction contains protocol identification information and first network address information of the first network device; and
   receiving, by the first network device, the second network address information fed back by the second network device according to the first network address information, and connecting to the second network device according to the second network address information.

2. The network connection method according to claim 1, wherein before said transmitting, by the detection device of the first network device, the detection instruction to the second network device in the preset format, the method comprises:

performing an optical modulation on the detection instruction to obtain a modulated directional optical signal by the detection device of the first network device; and/or, performing a radio frequency modulation on the detection instruction to obtain a modulated radio frequency signal by the detection device of the first network device.

3. The network connection method according to claim 2, wherein said transmitting, by the first network device, the detection instruction to the second network device in the preset format comprises:

transmitting the directional optical signal corresponding to the detection instruction to the second network device by the detection device of the first network device; and/or, transmitting the radio frequency signal corresponding to the detection instruction to the second network device by the detection device of the first network device.

4. The network connection method according to claim 2, wherein said transmitting, by the first network device, the detection instruction to the second network device in the preset format comprises:

transmitting, by a directional optical signal transmitter of the detection device of the first network device, a modulated signal to an optical signal receiver of the second network device in a form of directional optical signal; or, transmitting, by a radio frequency signal transceiver of the detection device of the first network device, the modulated signal in a form of radio frequency signal to a radio frequency signal transceiver of each of a plurality of network devices in an effective signal coverage.

5. The network connection method according to claim 1, wherein the detection instruction comprises screening information, and the second network device stores query information;

said receiving, by the first network device, the second network address information fed back by the second network device according to the first network address information comprises:

receiving, by the detection device of the first network device, the second network address information fed back by the second network device through a network according to the first network address information, when the query information conforms to the screening information.

6. The network connection method according to claim 5, wherein the detection instruction is used to detect one or multiple or all Internet protocols, and the second network device comprises one or a plurality of network devices, and the second network device stores lots of network address information;

the method further comprises:

by the detection device of the first network device, transmitting the detection instruction to the plurality of network devices simultaneously, and instructing the plurality of network devices to query network address information conforming to the standard of the detection instruction according to the protocol identification information, and receiving the second network address information fed back by the plurality of network devices according to the first network address information.

7. The network connection method according to claim 6, further comprising:

connecting the first network device to the one or plurality of network devices through a network application according to a network address and a port corresponding to the network protocol carried in the network address information, after the first network device receives the network address information fed back by the second network device through the network.

8. A network connection method, comprising:

receiving, by a second network device, a detection instruction in a preset format from a first network device, wherein the detection instruction comprises protocol identification information and first network address information of the first network device;

querying second network address information conforming to a standard of the detection instruction from a detection device by the second network device according to the protocol identification information;

transmitting, by the second network device, the second network address information to the first network device according to the first network address information to enable the first network device to connect to the second network device according to the second network address information.

9. The network connection method according to claim 8, wherein said receiving, by a second network device, the detection instruction in the preset format sent by the first network device comprises:

receiving a directional optical signal corresponding to the detection instruction from the first network device by the second network device; and/or, receiving a radio frequency signal corresponding to the detection instruction from the first network device by the second network device.

10. The network connection method according to claim 9, wherein after said receiving, by the second network device, the detection instruction in the preset format from the first network device, the method further comprises:

demodulating the directional optical signal to obtain a demodulated detection instruction by an optical signal modem of the second network device; and/or, demodulating the radio frequency signal to obtain a demodulated detection instruction by a radio frequency modem of the second network device.

11. The network connection method according to claim 8, further comprising:

receiving, by an optical signal receiver or a radio frequency signal transceiver in a detection device of the second network device, a modulated signal in a form of directional optical signal or in a form of radio frequency signal and transmitting the modulated signal to the optical signal modem or the radio frequency signal modem of the second network device to be demodulated, and transmitting a demodulated signal from an optical signal modem or a radio frequency signal modem of the second network device to a controller of the second network device;

wherein the modulated signal is obtained by modulating the detection instruction through an optical signal modem or a radio frequency signal modem of the first network device, and is transmitted to the second network device through a directional optical signal transmitter or a radio frequency signal transceiver of the first network device.

12. The network connection method according to claim 11, wherein a directional optical signal receiver in the detection device of the second network device is an optical signal receiver based on photoelectric inductive film and is configured to receive a directional optical signal sent by the first network device;

the radio frequency signal transceiver in the detection device of the second network device is a signal transceiver such as a radio frequency antenna, and is configured to receive a radio frequency signal sent by the first network device.

13. The network connection method according to claim 8, wherein the detection instruction comprises screening information, and the second network device stores query information;
said transmitting, by the second network device, the second network address information to the first network device according to the first network address information comprises:
transmitting, by the second network device, the second network address information through a network to the first network device according to the first network address information, when the query information conforms to the screening information.

14. The network connection method according to claim 8, wherein said querying the second network address information conforming to the standard of the detection instruction from the detection device by the second network device according to the protocol identification information comprises:
querying a network address, a network protocol and port information of the second network device according to the protocol identification information from a memory of the detection device by the second network device.

15. A first network device, comprising a detection device, a memory, a processor, and a computer program stored in the memory and executable by the processor, wherein the processor is configured to, when executing the computer program, implement a network connection method, comprising:
transmitting a detection instruction in a preset format to a second network device to instruct the second network device to query second network address information conforming to a standard of the detection instruction from a memory of a detection device according to protocol identification information, wherein the detection instruction contains protocol identification information and first network address information of the first network device; and
receiving the second network address information fed back by the second network device according to the first network address information, and connecting to the second network device according to the second network address information.

16. The first network device according to claim 15, wherein the detection device is connected to the first network device through a data line or a wireless network; or
the detection device is mounted on a housing of the first network device, and is connected to the first network device through the data line or the wireless network.

17. The first network device according to claim 15, wherein a photoelectric inductive film is integrated on an outer surface of a housing of the network device or a transparent photoelectric inductive film is integrated on a screen of the network device as an optical signal receiver; furthermore, a laser emitter or an LED light source is integrated as a directional optical signal transmitter; and a controller, an optical signal modem, a radio frequency modem and a radio frequency antenna are integrated inside the housing of the network device.

18. The first network device according to claim 17, wherein the photoelectric inductive film is transparent, translucent or opaque; the photoelectric inductive film comprises: a first transparent conductive layer, a photoelectric conversion layer, and a second conductive layer, the photoelectric conversion layer is arranged between the first transparent conductive layer and the second conductive layer; and a directional optical signal is detected by a current generated by a light beam on the photoelectric inductive film.

19. The first network device according to claim 18, wherein the first transparent conductive layer is one selected from a group consisting of a transparent metal film, a transparent metal oxide film, a transparent graphene film, a carbon nanotube film or a transparent film based on a conductive polymer material;
the second conductive layer is an opaque or translucent or transparent conductive layer; the second conductive layer is one selected from a group consisting of a metal film, a metal oxide film, a graphene film, a carbon nanotube film and a film based on a conductive polymer material.

20. The first network device according to claim 18, wherein the photoelectric conversion layer is made of an opaque or semi-transparent semiconductor photovoltaic material, and is based on monocrystalline silicon, polysilicon, amorphous silicon, cadmium telluride, copper indium gallium selenide, copper zinc tin sulfide, copper zinc tin selenium, copper indium selenium, gallium arsenide, organic semiconductor or perovskite.

* * * * *